April 21, 1953 R. L. CARROLL 2,635,829
YARN CAKE HOLDER FOR WINDERS
Filed Jan. 3, 1950 3 Sheets-Sheet 1
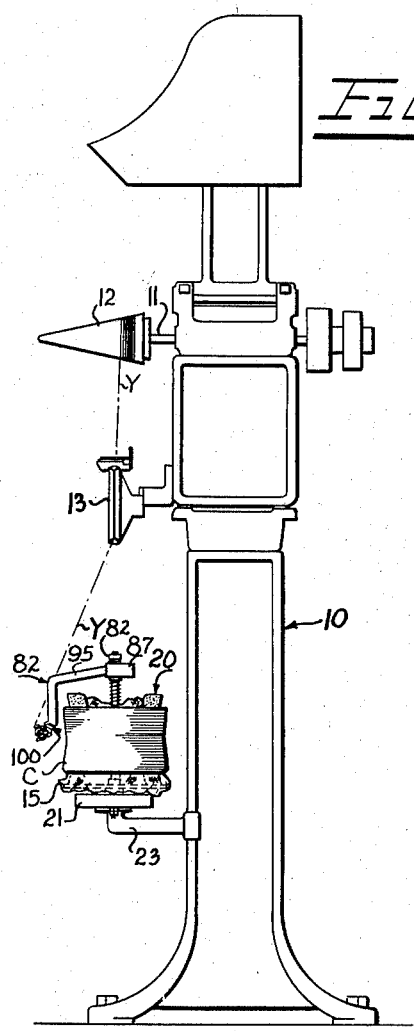
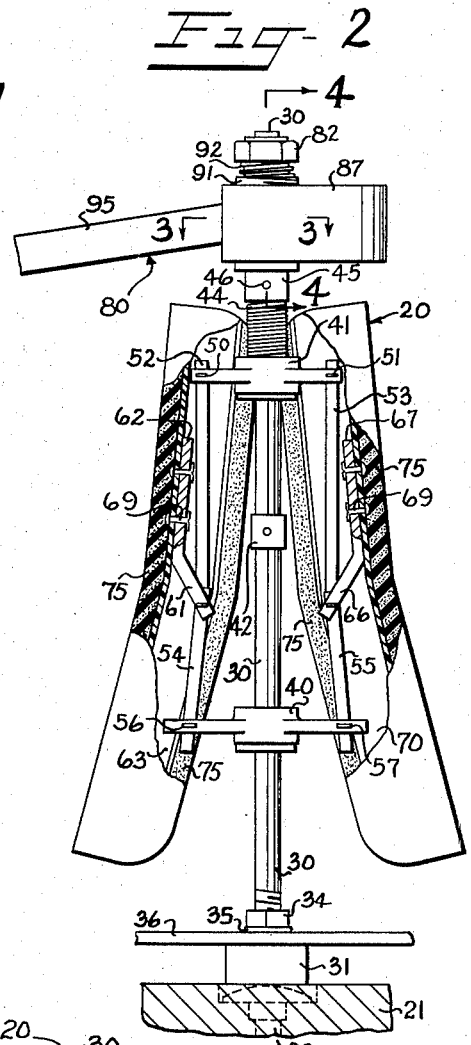
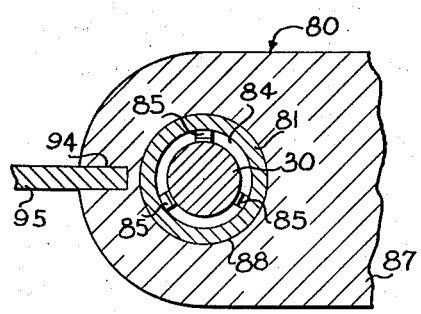
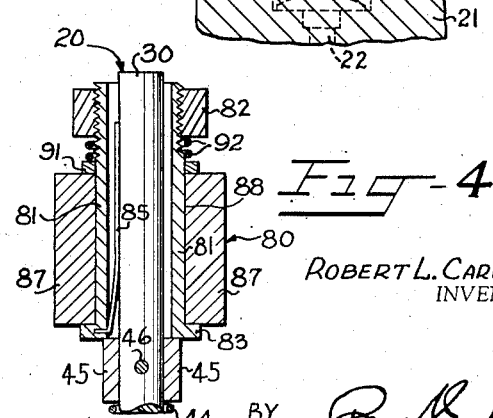
ROBERT L. CARROLL,
INVENTOR.
BY
ATTORNEY

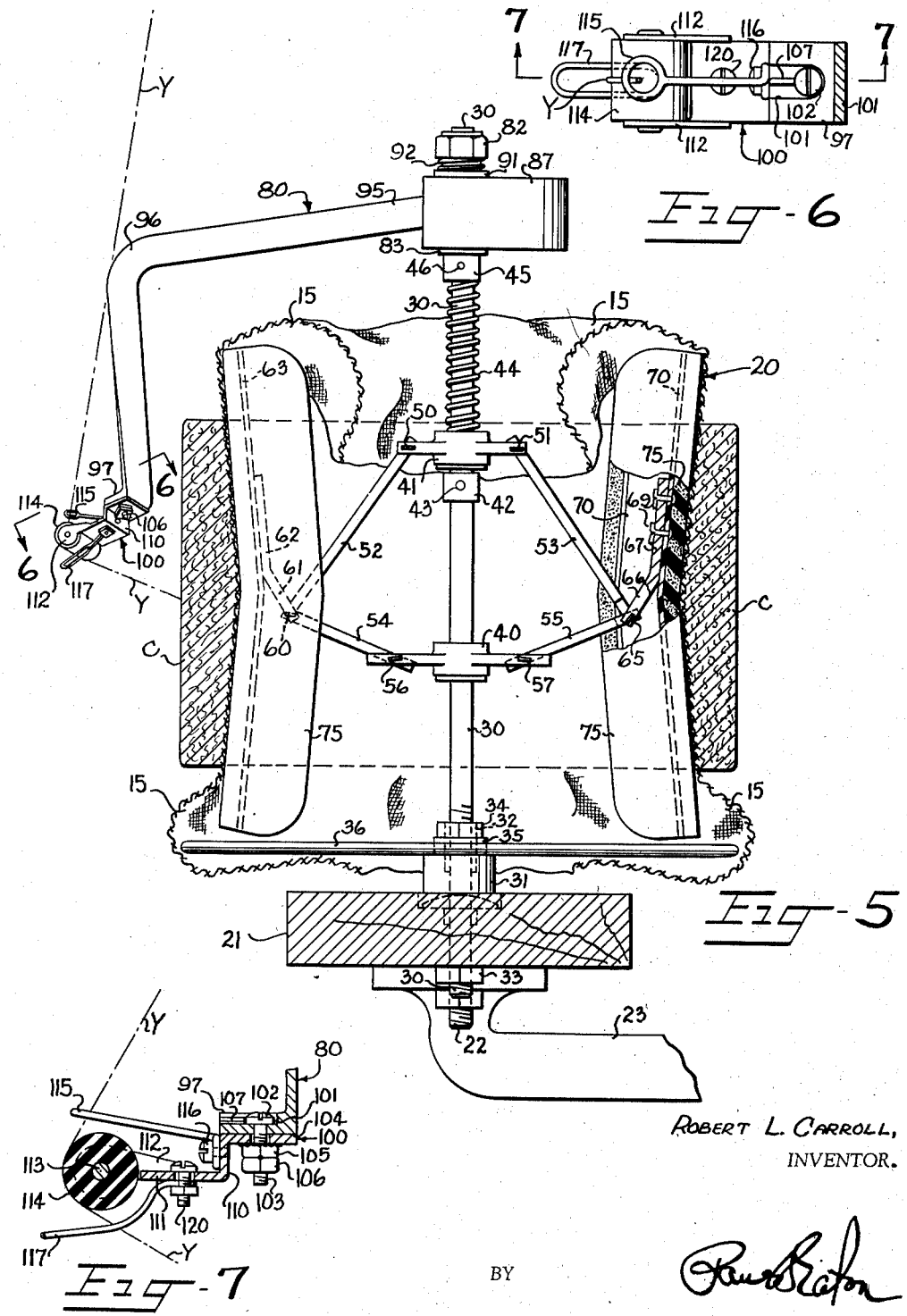

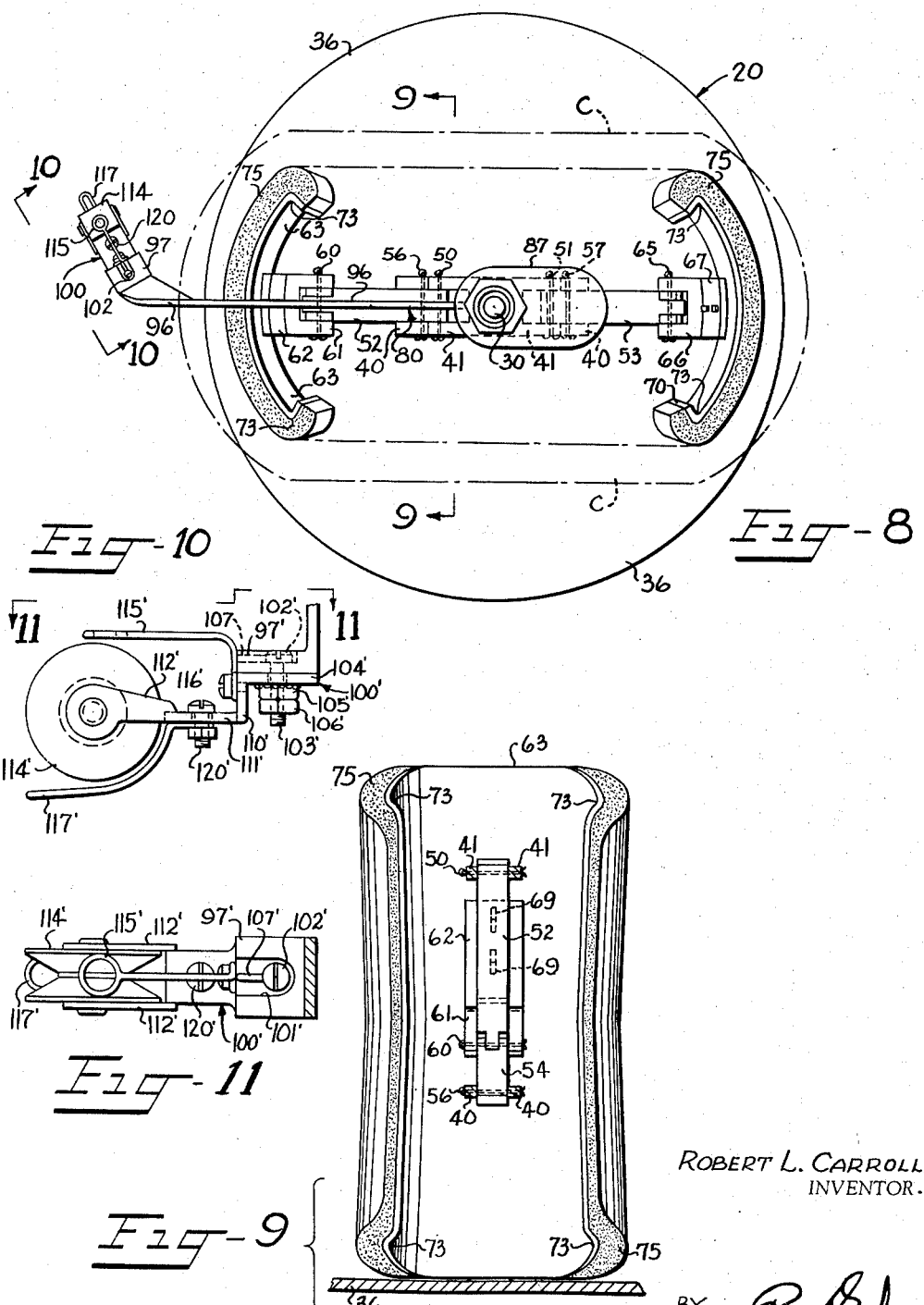

Patented Apr. 21, 1953

2,635,829

UNITED STATES PATENT OFFICE 2,635,829

YARN CAKE HOLDER FOR WINDERS

Robert L. Carroll, Greenville, S. C.

Application January 3, 1950, Serial No. 136,507

1 Claim. (Cl. 242—111)

This invention relates to improvements in reels, spindles and the like and more especially to an improved synthetic yarn cake holder of a type on which rayon, nylon, or the like may be retained as the material is unwound from the same and wound onto bobbins or the like, as in a winding machine.

It is well known to those familiar with the art that synthetic yarns, and particularly rayon yarns, are usually spun in the form of a so-called cake, which cake is formed by spinning the rayon against the interior wall of a barrel which is either cylindrical or frusto-conical on the inside thereof. These rayon cakes are usually formed by employing compressed air to project the strand of yarn against the interior wall of the barrel and, as a result, the central portion of the cake is usually of substantially greater thickness than the opposed end portions thereof. As the cake is removed from the barrel, a pliable tubular member, usually termed a sock, is inserted within the opening extending longitudinally of the cake, and after the cake is removed from the barrel, the portions of the sock which extend beyond opposed ends of the cake are folded back over the cake towards each other to form a package in which the cake is retained during the interim preceding other operations.

Therefore, the primary object of this invention is to provide an improved collapsible cake holder comprising a plurality of radially spaced elongated segmental members onto which the sock may be placed with the rayon yarn disposed therearound and, upon the cake with the sock being placed on the cake holder, the cake holder may be expanded by an operator merely inserting his thumbs in the upper end of the cake holder and moving the segmental members of the cake holder slightly apart from each other, there being suitable spring means provided for further expanding the cake holder and which will hold the same in expanded position to thus resiliently hold the cake and its associated sock thereon.

It is another object of this invention to provide a cake holder of the type described which comprises at least two elongated members which are curved transversely throughout their length and which are pivotally connected intermediate the ends thereof to links, the elongated members being normally spaced apart from each other and the links projecting divergently towards each other and being pivotally connected to a pair of trunnions, one of which is fixedly mounted on a post disposed between and extending in spaced parallel relation to the elongated members and the other of which is mounted for vertical sliding movement on the post and is normally urged by spring means towards the fixed trunnion. The points at which one end of the links are connected to the trunnions are spaced from the post and the elongated members have inwardly projecting means thereon to which the other ends of the links are connected so that, when the cake holder is collapsed, the inner ends of the inwardly projecting means are disposed closer to the post than the points on the trunnions to which the other ends of the links are connected. Thus, the proximate ends of the links are disposed inwardly of "dead-center" of the remote ends thereof when the cake holder is collapsed and the spring means will retain the cake holder in a collapsed position until the elongated members are moved apart from each other sufficiently to move the proximate ends of the links at each side of the posts outwardly away from the post, beyond said "dead-center" and to where the spring means may project the movable trunnion toward the fixed trunnion to move the elongated members apart from each other, it being understood that a rayon cake may be placed around these elongated members prior to the elongated members being moved apart from each other in the manner described.

It is another object of this invention to provide an improved revoluble guide member, in combination with a cake holder of the type described, for directing the yarn from the cake on the cake holder. As the yarn is unwound from the cake holder, the cake holder remains stationary and, therefore, the guide member must revolve about the cake holder. Therefore, the guide member is rotatably mounted on the post on which the trunnions of the cake holder are mounted and comprises an arm which extends outwardly from the post and has a longitudinally extending portion, which extends substantially parallel to the post, and which terminates adjacent the outer periphery of the cake carried by the cake holder. The free end of this arm has a roller thereon which is so positioned that the yarn from the cake may be withdrawn from the same in such a manner as to move substantially tangent to the periphery of the cake, the axis of this roller also being disposed at such an angle as to direct the yarn with a minimum of resistance to a winding machine or the like.

It often happens that the yarn will break or the bobbin onto which the yarn is being wound from the cake will be filled prior to the cake being completely unwound from the cake holder and, therefore, suitable means are provided for retaining the free end of the yarn closely adjacent the roller of the guide member so that, upon further rotation of the roller about the periphery of the cake holder after the yarn has been severed, the yarn will remain closely adjacent the roller and may be readily threaded about the same for piecing the ends of the yarn.

Some of the objects of the invention having been stated, other objects will appear as the description proceeds when taken in connection with the accompanying drawings, in which—

Figure 1 is an end elevation of a typical winding machine showing the improved cake holder and guide means therefor associated therewith;

Figure 2 is an enlarged elevation of the cake holder removed from the winding machine, with a portion of the revoluble guide member broken away and showing the cake holder in a collapsed position but omitting the rayon cake;

Figure 3 is an enlarged fragmentary sectional plan view taken substantially along the line 3—3 in Figure 2;

Figure 4 is an enlarged fragmentary vertical sectional view taken substantially along the line 4—4 in Figure 2;

Figure 5 is an enlarged elevation of the cake holder in an expanded position with parts broken away and showing the rayon cake and the sock therefor in cross-section;

Figure 6 is an enlarged sectional plan view through the feeding end of the improved revoluble guide member and is taken substantially along the line 6—6 in Figure 5;

Figure 7 is a vertical sectional view taken substantially along the line 7—7 in Figure 6;

Figure 8 is a top plan view of the cake holder shown in Figure 5, the rayon yarn cake being shown in dash-dot lines;

Figure 9 is an elevation of one of the elongated segmental members of the cake holder and showing the trunnions in cross-section and is taken substantially along the line 9—9 in Figure 8, but omitting the revoluble guide member;

Figure 10 is an enlarged fragmentary elevation looking substantially along the line 10—10 in Figure 8 but showing a modified form of guide roller at the free end of the revoluble guide member;

Figure 11 is a top plan view with parts in section looking down along the line 11—11 in Figure 10.

Referring more specifically to the drawings the numeral 10 broadly designates a suitable machine with which the present cake holder may be used. The present machine 10 is, in this instance, a type of winding machine such as is manufactured by Universal Winding Company, Providence, Rhode Island, and is commonly referred to as their No. 50 Overend Winding Machine. The winding machine in Figure 1 includes a driven cone or spool holder 11 on which a cone or spool 12 is adapted to be placed and to which yarn Y is directed through a suitable traverse motion, not shown. The yarn Y extends to the cone or spool 12 from a conventional thread guiding mechanism 13 which is a usual part of winding machines of this type and to which the yarn Y is directed from a cake of yarn indicated at C. The cake of yarn surrounds a medial portion of a conventional sock 15 and this sock 15 will hereinafter be considered as a part of the cake C. The sock 15 with the cake C thereon is shown as being mounted on a cake holder broadly designated at 20 and which is the preferred embodiment of the present invention and will be later described in detail.

The cake holder 20 is supported on a conventional spindle rail 21 secured, as by bolts 22, to conventional brackets 23, only one of which is shown in the drawings. The rail 21 and the brackets 23 are a usual part of the machine 10 and a further description of the machine 10 is believed unnecessary since the invention resides in the cake holder 20.

The cake holder 20 comprises a spindle or post 30 the threaded lower end of which slidably penetrates the spindle rail 21 as well as a sleeve 31 having a bushing 32 therein which is also slidably penetrated by the threaded lower end of the spindle 30. The spindle 30 is secured in the rail 21 as well as the sleeve 30 by lock nuts 33 and 34 threadably mounted on the lower portion of the spindle 30 and engaging remote surfaces of the spindle rail 21 and the sleeve 31. The sleeve 31 has a restricted portion 35 integral therewith on which is fixedly mounted, as by a pressed fit, a disk 36 which rests against the shoulder formed in the sleeve 31 by the restricted portion 35 and is thus spaced apart from the spindle rail 21.

Fixedly mounted on the spindle 30 is a fixed trunnion 40 which is secured on the spindle 30 by any suitable means such as a pressed fit. The post or spindle 30 also has a movable trunnion 41 mounted for longitudinal sliding movement thereon and disposed between the movable and the fixed trunnions 41 and 40, respectively, is a collar 42 which is fixedly mounted on the spindle 30 by any suitable means such as a dowel pin 43. The collar 42 is provided to restrict movement of the movable trunnion towards the fixed trunnion when a cake C is not mounted on the cake holder 20. It will be observed, in Figures 2 and 5, that this collar 42 is disposed substantially half-way between the fixed trunnion 40 and the movable trunnion 41 when the cake holder 20 is in a collapsed position.

Surrounding the spindle 30 and bearing against the upper surface of the movable trunnion 41, in Figures 2 and 5, is a compression spring 44 the other end of which bears against a collar 45 fixedly mounted on the spindle 30, by any suitable means such as a dowel pin 46. Pivotally connected, as at 50 and 51, to the movable trunnion 41 are the upper ends of upper links 52 and 53, respectively. The fixed trunnion 40 has the lower ends of similar links 54 and 55 pivotally connected thereto as at 56 and 57 respectively.

The free ends of the lower links 54 and 55 are suitably slotted for reception of the lower free ends of the upper links 52 and 53 and the free ends of the links 52 and 54 are pivotally connected, as at 60 to each other and to an inwardly bent lower portion 61 of a plate 62 suitably secured to the inner surface of an elongated segmental member 63.

The free ends of the links 53 and 55 are pivotally connected, as at 65, to each other and to an inwardly bent portion 66 of a plate 67, which is identical to the plate 62, and is secured, as by rivets 69, to the inner surface of a second elongated segmental member 70 which is identical to the segmental member 63 except being opposite hand.

Although only the two elongated segmental members 63 and 70 are shown in the drawings, it is evident that several elongated segmental members of similar construction may be connected to the trunnions 40 and 41 with suitable linkage, if so desired, so the rayon cake C may be more nearly circular than elliptical as shown in Figure 9. These elongated segmental members 63 and 70 are preferably molded of a plastic material or formed from a relatively light sheet metal and the members 62 and 67, having the inwardly projecting portions 61 and 66, respectively, may be molded integral with the segmental members 63 and 70 or stamped therein as desired.

Due to the fact that the central portion of a cake of yarn is usually of slightly smaller internal diameter than the opposed end portions thereof, the elongated segmental members 63 and 70 are curved so that their radii to the outer surface of the members 63 and 70 at their central portions is smaller than their radii at their upper and lower ends. In other words, the upper and lower ends of the elongated segmental members 63 and 70 are formed according to a predetermined radius in cross-section and the central portion thereof is formed according to a smaller radius, the point from which the radii originate being the same for the central portions of the elongated segmental members 63 and 70 as it is for the outer end portions thereof.

This variation in radius of the curvature of the elongated segmental members 63 and 70 throughout their length, along with the pivotal connection between the elongated segmental members 63 and 70 and the trunnions 40 and 41, will not only cause the members 63 and 70, when expanded to the position shown in Figure 5, to conform generally to the configuration of the inner periphery of the cake of yarn C, but will also cause a uniform tension to be applied to the yarn throughout the vertical length of the cake C. This is particularly important upon the major portion of the cake of yarn C having been withdrawn from the cake holder 20.

Referring to Figures 8 and 9, it will be observed that the opposed edges of each of the elongated segmental members 63 and 70 are curved inwardly as at 73 and a suitable resilient covering material 75, such as sponge rubber, is adhesively secured to the outer surfaces of the elongated segmental members 63 and 70. It is preferred that the resilient covering material 75, which is applied to the outer surfaces of the elongated segmental members 63 and 70, comprise a foam rubber material which, due to its soft texture, will also assist in creating a uniform tension against the yarn in the cake C as the yarn Y is withdrawn from the cake C.

The reason the opposed edges 73 of the elongated segmental members 63 and 70 are curved inwardly, as shown in Figure 8, is to prevent the outer edges of the elongated segmental members 63 and 70 from engaging and possibly severing the yarn in the cake C after the major portion thereof has been removed from the cake holder 20.

In operation, the cake of synthetic yarn C is held in both hands by the operator and is placed over the segmental members in the collapsed position shown in Figure 2, these segmental members 63 and 70 being held in the collapsed position by the pressure of the compression spring 44 against the upper surface of the movable trunnion 41 and, also, due to the fact that the proximate ends of the links 52 to 56, inclusive, are disposed inwardly of "dead-center" of the pivot points 50, 51, 56 and 57.

Now, during the time that the cake C has been in storage, or during other processing or soaking operations, and while the cake C is being placed on the cake holder 20 with the elongated segmental members 63 and 70 in the collapsed position shown in Figure 2, the sock 15, which may be of paper or of a knitted textile material or the like, is wrapped around the cake C with the free edges thereof overlapping each other at the outer surface of the cake C. After the cake C has been placed over the elongated segmental members 63 and 70, the operator then projects his thumbs downwardly and against the inner surfaces of the elongated segmental members 63 and 70 and exerts an outward pressure thereon until the pivot points 60 and 65 at the proximate ends of the links 52 to 55, inclusive, are moved outwardly beyond "dead-center" relative to the pivot points 50, 51, 56 and 57 on the trunnions 41 and 40, respectively.

The compression spring 44 will then move the movable trunnion 41 downwardly towards the collar 42 and the resilient material 75 on the elongated segmental members 63 and 70 will engage the inner periphery of the cake C at diametrically opposed points. It is evident that regardless of whether the wall of the cake C of synthetic yarn is straight or is frusto-conical, the elongated segmental members 63 and 70 will conform substantially to the inner periphery of the cake C.

*Revoluble guide member*

After the cake C has been placed on the cake holder 20 and the elongated segmental members 63 and 70 have been moved to the expanded position shown in Figure 5, the portions of the sock 15 which project beyond opposed ends of the cake C are removed from the outer surfaces of the cake C and are tucked in between the elongated segmental members 63 and 70 at the upper ends thereof and are tucked beneath the disk 36 at the lower end thereof as shown in Figure 5.

A revoluble guide member broadly designated at 80 is then slidably mounted on the upper portion of the spindle 30 and rotatably engages the upper surface of the collar 45. This revoluble guide member 80 comprises a bushing or sleeve 81, the upper portion of which is threaded for reception of a nut 82 and the lower portion of which has an annular shoulder 83 integral therewith. This bushing or sleeve 80 has a longitudinally extending bore 84 therein, which may be of substantially greater diameter than the outside diameter of the upper portion of the spindle 30, and in the inner wall of which the lower ends of a plurality of leaf spring members 85 are embedded, there being three of these leaf spring members 85 shown in Figure 3 which extend longitudinally of the bushing 81. The purpose of these leaf spring members 85 is to provide means whereby the revoluble thread guide member 80 may be mounted on various sizes of spindles, the leaf spring members 85 serving to centrally locate and frictionally hold the bushing 81 on the upper end of the spindle 30.

Prior to the nut 82 being mounted on the upper end of the bushing 81, as shown in Figure 4, an elongated weight member 87 having an eccentrically located bore 88 therein is rotatably mounted on the bushing 81, the bushing 81 slidably penetrating the bore 88. A washer 91 is then placed against the upper surface of the weight member 87 and a relatively small compression spring 92 is then placed over the upper end of the bushing 81 after which the nut 82 is mounted on the threaded upper end of the bushing 81 and is tightened to the desired amount to create a desired amount of friction between the washer 91 and the weight member 87 and the shoulder 83. It is evident that this friction must be relatively light and is merely provided so as to prevent the revoluble guide member 80 from moving faster than the yarn which is being withdrawn from the cake C and being directed to the cone 12 (Figure 1).

The weight member 87 of the revoluble yarn guide member 80 has a cavity 94 therein (Figure 3) in which one end of an arm 95 may be adhesively secured or which may be secured therein as by a pressed fit. This arm 95 is preferably of plastic strip material or a relatively light metal, and extends outwardly beyond the vertical plane of the outer edge of the cake C, as is clearly shown in Figure 5, and is then bent downwardly and spirally, as at 96, and the lower end thereof is bent outwardly to form an outwardly bent portion 97 to which a thread guide roller bracket 100 is secured in a manner to be presently described.

The outwardly projecting portion 97 of the arm 95 has a cavity 101 in the upper surface thereof in which the head 102 of a bolt 103 is disposed, the bolt 103 slidably penetrating the bottom of the cavity 101 in the outwardly projecting portion 97 of the arm 95, as well as a planar portion 104 of the thread guide roller bracket 100. This bolt 103 then threadably penetrates suitable lock nuts 105 and 106. The lock nut 105 may be an integral part of the planar portion 104 of the thread guide roller bracket 100 or may be welded to the lower surface thereof so that rotation of the bracket 100 will also be transmitted to the head 102 of the bolt 103. The head 102 of the bolt 103 has an outwardly projecting pin 107 welded thereto and extending laterally within the cavity 101. It is thus seen that this pin 107 restricts rotation of the thread guide roller bracket 100 to an arc of approximately 30 degrees since the pin 107 will engage opposed side walls of the cavity 101 in the outwardly projecting portion 97 of the arm 95.

The thread guide roller bracket not only comprises a first planar portion 104 but also comprises a vertically disposed portion 110 and an outwardly extending second planar portion 111. A pair of spaced bearing portions 112 project outwardly from the planar portion 111 of the thread guide roller bracket 100 and have opposed ends of a stub shaft 113 rotatably mounted therein and on which a suitable thread guide roller 114 is fixedly mounted. This thread guide roller 114 may be of a soft or resilient material, such as rubber, if so desired. Disposed above the thread guide roller 114 is the outer end of a thread eye member 115 which projects inwardly and is secured as by a screw 116, to the vertically disposed portion 110 of the thread guide roller bracket 100. Disposed beneath and in spaced relation to the thread guide roller 114 is an elongated thread retaining eye member 117 which extends inwardly and is bent upwardly and is secured, as by a bolt 120, to the lower surface of the second planar portion 111 of the thread guide roller bracket 100.

The purpose of the eye members 115 and 117 is not only to serve as a means for guiding the yarn Y past the thread guide roller 114, but is also to prevent the yarn, in the event of its breakage or in the event of a cone or spool 12 becoming filled with yarn prior to the yarn being completely removed from the cake holder 20, from falling, by gravity, away from the roller 114. Since this yarn is of substantially the same diameter as human hair, the continued swinging or revolving movement of the thread guide arm 95 after the yarn has been severed, would cause the yarn to become entangled were it not for these eyes 115 and 117 and it would also be difficult for an operator to grasp the yarn Y for threading the yarn around the roller 114.

Referring to Figures 10 and 11, there is shown a slightly modified form of thread guide roller bracket which is secured to the outwardly projecting portion 97 of the arm 95 in identically the same manner in which the bracket 100, in Figure 7, is secured to the outwardly projecting portion 97. Identical parts of the modified form of the invention shown in Figures 10 and 11 will bear the same reference characters as the original form of the invention shown in Figure 7 with the prime notation added.

The modified form of the thread guide roller bracket 100' comprises first and second planar portions 104' and 111' which are joined by a vertically disposed portion 110'. However, the second planar portion 111', in Figures 10 and 11, is not as wide as the second planar portion 111 in Figure 7. This planar portion 111', in Figures 10 and 11, also has outwardly projecting bearing portion 112' integral therewith between which a peripherally grooved roller 114' is mounted. This grooved roller 114' is preferably larger in diameter than the flat roller 114 and the groove in the grooved thread guide roller 114' will assist in guiding the yarn Y past the same. It will be noted that the outwardly projecting portion 97 of the arm 95 extends at an angle relative to the axis of the cake holder 20 so that the yarn Y, upon being withdrawn from the cake holder 20, will travel in a line substantially tangent to the periphery of the cake holder 20 and will extend from the thread guide roller 114 and 114' tangent to these rollers as it extends to the conventional thread guiding mechanism 13 disposed in front of the winding machine 10 shown in Figure 1.

It is thus seen that I have provided an improved apparatus for holding a tubular cake of yarn which is very simple in its structure and comprising elongated members which, due to their manner of being mounted, will conform to the configuration of the inner diameter of the tubular cake of yarn and which are contractable or expandable relative to each other so a cake of yarn may be mounted thereon when they are in their collapsed state and by a mere flick of the fingers, the elongated members may be moved to their expanded position. I have also provided an improved thread guiding apparatus especially adapted for use with this type of cake holder which may be quickly removed from the cake holder for replenishing the supply of yarn on the cake holder and which will guide the yarn from the cake holder in a straight line substantially tangent to the periphery of the cake holder thus eliminating the necessity of the yarn being withdrawn from the cake lengthwise of the cake, which would result in the yarn being broken or in several rounds of yarn being removed from the cake simultaneously and thus becoming entangled.

If so desired, the compression spring 44 may be omitted from the cake holder 20 (Figure 5) and the weight of the rayon cake C may be utilized in holding the segmental members 63 and 70 in an opened or expanded position. In other words, an operator may place a cake C over the segmental members 63 and 70, while the members 63 and 70 are in a closed position, and then move the segmental members 63 and 70 apart from each other to where their outer surfaces will engage the inner surface of the cake C. The weight of the cake C will then be transmitted to the segmental members 63 and 70, due to frictional contact therewith, and will tend to move these segmental members 63 and 70 downwardly in Figure 5, by gravity, inasmuch as the proximate ends of the links 52 and 54 and the proximate ends of the links 53 and 55 will be disposed in a vertical plane outwardly of the proximate ends of the links 54 and 55. It is evident that, upon the segmental members 63 and 70 and the cake C thereon tending to move downwardly, by gravity, the links 52 and 53, connected to the segmental members 63 and 70, will tend to move the movable trunnion 41 downwardly and will thus tend to move the elongated segmental members 63 and 70 apart from each other to support the cake of yarn C. This is especially true in rayon plants in which all rayon cakes C processed are of substantially the same diameter.

Now, as the yarn Y is unwound from the cake C, the weight of the cake C will decrease and thus the pressure of the elongated segmental members 63 and 70 against the yarn in the cake C will also decrease accordingly. Thus, the spring 44, when employed, assists in urging the members 63 and 70 apart from each other in the manner heretofore described.

In the drawings and specification there has been set forth a preferred embodiment of the invention, and although specific terms are employed, they are used in a generic and descriptive sense only, and not for purposes of limitation, the scope of the invention being defined in the claim.

I claim:

A cake holder for receiving a tubular cake of yarn and the like comprising a spindle, a fixed trunnion and a movable trunnion mounted on spindle in spaced relation to each other, a pair of diametrically opposed elongated segmental members extending substantially parallel to said spindle, a pivotal connection between the fixed trunnion and the proximate central portions of the elongated segmental members, another pivotal connection between the movable trunnion and the same central portion of the elongated segmental members, spring means normally urging the movable trunnion towards the fixed trunnion to thus normally urge the elongated segmental members outwardly with respect to each other, the pivotal connections comprising links pivotally connected at one of their ends to opposed sides of the trunnions and being pivotally connected at their other ends to the proximate central portions of the elongated segmental members, said links being connected to opposed sides of the trunnions at points removed from the periphery of the spindle so that, upon the elongated segmental members being moved toward each other, the points at which the ends of the levers are connected to the medial portions of the elongated segmental members will be disposed more closely adjacent each other than the points at which the other ends thereof are connected to the trunnions and whereby the spring means will tend to hold the elongated segmental members in collapsed position.

ROBERT L. CARROLL.

References Cited in the file of this patent

UNITED STATES PATENTS

| Number | Name | Date |
|---|---|---|
| 405,560 | Kaspar | June 18, 1889 |
| 1,169,004 | Cargin | Jan. 18, 1916 |
| 1,659,416 | Warren | Feb. 14, 1928 |
| 1,992,915 | Hofmann | Feb. 26, 1935 |
| 2,237,994 | Long | Apr. 8, 1941 |
| 2,257,837 | Burge et al. | Oct. 7, 1941 |
| 2,318,906 | Troche | May 11, 1943 |
| 2,382,968 | Berman | Aug. 21, 1945 |
| 2,416,785 | Welch | Mar. 4, 1947 |
| 2,451,352 | Nau-Touron | Oct. 12, 1948 |

FOREIGN PATENTS

| Number | Country | Date |
|---|---|---|
| 798 | Great Britain | Jan. 13, 1893 |
| 623,756 | France | Mar. 22, 1927 |